United States Patent
Jiang

(10) Patent No.: US 12,342,382 B2
(45) Date of Patent: Jun. 24, 2025

(54) METHOD AND APPARATUS FOR PROCESSING RANDOM ACCESS

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 603 days.

(21) Appl. No.: 17/429,926

(22) PCT Filed: Feb. 14, 2019

(86) PCT No.: PCT/CN2019/075049
§ 371 (c)(1),
(2) Date: Aug. 10, 2021

(87) PCT Pub. No.: WO2020/164041
PCT Pub. Date: Aug. 20, 2020

(65) Prior Publication Data
US 2022/0132581 A1    Apr. 28, 2022

(51) Int. Cl.
*H04W 74/0833* (2024.01)
*H04W 52/02* (2009.01)
*H04W 74/00* (2009.01)

(52) U.S. Cl.
CPC ... *H04W 74/0833* (2013.01); *H04W 52/0245* (2013.01); *H04W 74/006* (2013.01)

(58) Field of Classification Search
CPC ........... H04W 74/004; H04W 74/0833; H04W 74/006; H04W 74/008; H04W 52/0245
See application file for complete search history.

(56) References Cited

U.S. PATENT DOCUMENTS 10,314,005 B2 *  6/2019  Kim ............. H04W 76/27
11,039,479 B2 *  6/2021  Shi ............. H04W 76/11
(Continued)

FOREIGN PATENT DOCUMENTS

CN    101904212 A    12/2010
CN    104144517 A    11/2014
(Continued)

OTHER PUBLICATIONS

Mediatek Inc: "UL BWP ambiguilty during RAR reception", 3GPP Draft; R2-1801272, 3rd Generation Partnership Project (3GPP), Mobile Competence Centre; 650, Route Des Lucioles; F-06921 Sophia-Antipolis Cedex; France, RAN WG2, Vancouver, Canada; Jan. 12, 2018 (Jan. 12, 2018), XP051386699, (4 pages).

(Continued)

*Primary Examiner* — Raj Jain
(74) *Attorney, Agent, or Firm* — Arch & Lake LLP

(57) ABSTRACT

A method and an apparatus for processing random access are provided. The method includes that: once a random access request sent by a user equipment (UE) is received, a base station generates random access response information, where the random access response information carries indication information, and the indication information is used to indicate a preamble sending position corresponding to a scheduling random access radio network temporary identifier (RA-RNTI) of a random access response message. Furthermore, the base station sends the random access response information to the UE.

18 Claims, 12 Drawing Sheets

(56) References Cited

U.S. PATENT DOCUMENTS

| | | | |
|---|---|---|---|
| 11,166,258 B2* | 11/2021 | Kim | ................ H04W 76/19 |
| 2015/0282215 A1 | 10/2015 | Eriksson et al. | |
| 2016/0088660 A1 | 3/2016 | Liu et al. | |
| 2016/0309475 A1 | 10/2016 | Wong et al. | |
| 2018/0343673 A1 | 11/2018 | Chen et al. | |
| 2020/0037367 A1* | 1/2020 | Kim | ................ H04W 74/006 |
| 2021/0212110 A1* | 7/2021 | Zhang | ................ H04W 74/004 |
| 2022/0132581 A1* | 4/2022 | Jiang | ................ H04W 74/0833 |
| 2023/0037317 A1* | 2/2023 | Kwak | ................ H04W 52/0245 |

FOREIGN PATENT DOCUMENTS

| | | | |
|---|---|---|---|
| CN | 106686691 A | 5/2017 | |
| CN | 107223353 A | 9/2017 | |
| CN | 107333222 A | 11/2017 | |
| CN | 107534977 A | 1/2018 | |
| CN | 108476480 A | 8/2018 | |
| CN | 108668361 A | 10/2018 | |
| CN | 109152081 A | 1/2019 | |
| EP | 3404991 A1 | 11/2018 | |
| JP | 2020510371 A | 4/2020 | |
| JP | 2022518780 A | 3/2022 | |
| RU | 2669523 C1 | 10/2018 | |
| WO | 2010052522 A1 | 5/2010 | |
| WO | 2018102966 A1 | 6/2018 | |
| WO | 2018174577 A1 | 9/2018 | |
| WO | 2018191839 A1 | 10/2018 | |
| WO | 2020151754 A1 | 7/2020 | |

OTHER PUBLICATIONS

CATT: "Initial Access and Mobility for NR Unlicensed Operations", 3GPP Draft; R1-1813282, 3rd Generation Partnership Project (3GPP), Mobile Competence Centre; 650, Route Des Lucioles; F-06921 Sophia-Antipolis Cedex; France, RAN WG1, Spokane, USA; Nov. 11, 2018 (Nov. 11, 2018), XP051555298, (5 pages).
"3rd Generation Partnership Project; Technical Specification Group Radio Access Network; NR; Medium Access Control (MAC) protocol specification (Release 15)", 3GPP Standard; Technical Specification; 3GPP TS 38.321, 3rd Generation Partnership Project (3GPP), Mobile Competence Centre; 650, Route Des Lucioles F-06921 Sophia-Antipolis Cedex; France, RAN WG2, V15.4.0, Jan. 11, 2019(Jan. 11, 2019), pp. 1-77, XP051591686, (77 pages).

Ericsson: "Solution to RA-RNTI ambiguity", 3GPP Draft; R2-1814781, 3rd Generation Partnership Project (3GPP), Mobile Competence Centre; 650, Route Des Lucioles; F-06921 Sophia-Antipolis Cedex; France, RAN WG2, Chengdu, PR China; Sep. 28, 2018 (Sep. 28, 2018), XP051524167, (4 pages).
Supplementary European Search Report in the European application No. 19914753.9, mailed on Feb. 2, 2022, (12 pages).
Office Action of the Indian application No. 202147040523, issued on Mar. 22, 2022, (6 pages).
First Office Action of the Chinese Application No. 201980000195.0, issued on Oct. 15, 2021, with English translation, (20p).
English translation of the Written Opinion of the International Search Authority in the international application No. PCT/CN2019/075049, mailed on Nov. 12, 2019, (3p).
First Office Action of the Russian Application No. 2021126143, issued on Apr. 14, 2022, (54p).
Notice of Allowance of the Chinese Application No. 201980000195.0, issued on Apr. 20, 2022, (5p).
Motorola Mobility, Lenovo, "Random Access Response in Multi-Beam Operation", 3GPP TSG RAN WG1 Meeting #88bis R1-1705550, Spokane, USA, Apr. 3-7, 2017, (3p).
Samsung, "Random Access Response Reception in NR-U", 3GPP TSG-RAN2 104 R2-1816312, Spokane, USA, Nov. 12-16, 2018,(2p).
Xiaomi Communications, "Consideration on extending RAR window size", 3GPP TSG-RAN2 #105 R2-1901907, Athens, Greece, Feb. 25-Mar. 1, 2019,(2p).
Samsung, "Random Access Response Reception in NR-U", 3GPP TSG-RAN2 105 R2-1900136, Athens, Greece, 25th Feb.-Mar. 1, 2019,(3p).
ZTE Corporation et al, "Considerations on RAR window expansion for NR-U", 3GPP TSG RAN WG2 NR #105bis Meeting R2-1903538, Xi'an, China, Apr. 8-Apr. 12, 2019,(2p).
First Office Action of the Japanese application No. 2021-547408, issued on Sep. 2, 2022, with English translation,(6p).
International Search Report of PCT Application No. PCT/CN2019/075049 dated Nov. 12, 2019 with English translation (4p).
Huawei, "Considerations on random access Addition of NR test case 7.1.1.1.3_SI Request", 3GPP TSG RAN 5 Meeting #81 R5-186958, dated Nov. 16, 2018, (9p).
Intel Corporation, "Considerations on random access procedure for Release-13 low complexity UEs and enhanced coverage", 3GPP TSG-RAN WG2 Meeting #91 R2-153278, Aug. 28, 2015 (5p).
Hearing Notice of the Indian application No. 202147040523, issued on Feb. 28, 2024 with English translation, (2p).

* cited by examiner

METHOD AND APPARATUS FOR PROCESSING RANDOM ACCESS

CROSS-REFERENCE TO RELATED APPLICATION

This application is the U.S. national phase application of International Application No. PCT/CN2019/075049, filed on Feb. 14, 2019, the entire contents of which are incorporated herein by reference for all purposes.

TECHNICAL FIELD

The present disclosure generally relates to the technical field of communications, and more particularly, to a method and apparatus for processing random access.

BACKGROUND

In a related art, in a contention-based random access procedure, user equipment (UE) sends a preamble to a base station through a random access request message. The base station uses random access radio network temporary identifiers (RA-RNTIs) to mark preamble sending positions, and then informs the UE of the RA-RNTIs. The UE receives a random access response message in a random access response window, uses the RA-RNTIs to determine corresponding preamble sending positions, and then determine the preamble corresponding to the random access response message received currently, that is, to determine whether the random access response message received currently corresponds to the random access request sent by itself before. However, for new radio-unlicensed (NR-U) band, the base station cannot send the random access response message in the random access response window under the principle of listen before talk (LBT). When the random access response message is successfully sent, a scheduling RA-RNTI of the random access response message may correspond to multiple preamble sending positions, resulting in that the UE is unable to determine which preamble sending position corresponds to the RA-RNTI.

SUMMARY

The present disclosure provides a method and apparatus for processing random access. The technical solutions are implemented as follows.

According to a first aspect of the present disclosure, a method for processing random access is provided. The method includes that a base station generates random access response information after receiving a random access request sent by a UE, where the random access response information includes indication information configured to indicate a preamble sending position corresponding to a scheduling RA-RNTI of a random access response message. Further, the method includes that the base station sends the random access response information to the UE.

According to a second aspect of the present disclosure, a method for processing random access is provided. The method includes that a UE receives, after sending a random access request, random access response information sent by a base station, where the random access response information includes indication information. Further, the method includes that the UE determines a preamble sending position corresponding to a scheduling RA-RNTI of the random access response message according to the indication information.

According to a third aspect of the present disclosure, an apparatus for processing random access is provided. The apparatus includes a processor and a memory configured to store instructions executable by the processor.

Further, the processor is configured to: generate, after receiving a random access request sent by UE, random access response information, the random access response information including indication information configured to indicate a preamble sending position corresponding to a scheduling RA-RNTI of a random access response message; and send the random access response information to the UE.

According to a fourth aspect of the present disclosure, an apparatus for processing random access is provided. The apparatus includes a processor and a memory configured to store instructions executable by the processor.

Further, the processor is configured to: receive, after sending a random access request, random access response information sent by a base station, the random access response information including indication information; and determine a preamble sending position corresponding to a scheduling RA-RNTI of the random access response message according to the indication information.

According to a fifth aspect of the present disclosure, a computer-readable storage medium is provided, in which computer instructions may be stored, and the instructions may be executed by a processor to implement the method applied to a base station side according to the first aspect above.

According to a sixth aspect of the present disclosure, a computer-readable storage medium is provided, in which computer instructions may be stored, and the instructions may be executed by a processor to implement the method applied to a UE side according to the second aspect above.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

In a related art, in a contention-based random access procedure, user equipment (UE) sends a preamble to a base station through a random access request message. The base station uses random access radio network temporary identifiers (RA-RNTIs) to mark preamble sending positions, and then informs the UE of the RA-RNTIs. The UE receives a random access response message in a random access response window, uses the RA-RNTIs to determine corresponding preamble sending positions, and then determine the preamble corresponding to the random access response message received currently, that is, to determine whether the random access response message received currently corresponds to the random access request sent by itself before. However, for new radio-unlicensed (NR-U) band, the base station cannot send the random access response message in the random access response window under the principle of listen before talk (LBT). When the random access response message is successfully sent, a scheduling RA-RNTI of the random access response message may correspond to multiple preamble sending positions, resulting in that the UE is unable to determine which preamble sending position corresponds to the RA-RNTI.

In order to solve the above problem, indication information is added in the embodiments, indicating the preamble sending position corresponding to the scheduling RA-RNTI of the random access response message. Thus, the UE may realize which preamble sending position corresponds to the scheduling RA-RNTI of the random access response message, thereby reducing fuzziness of the preamble sending position.

Figure 1A:
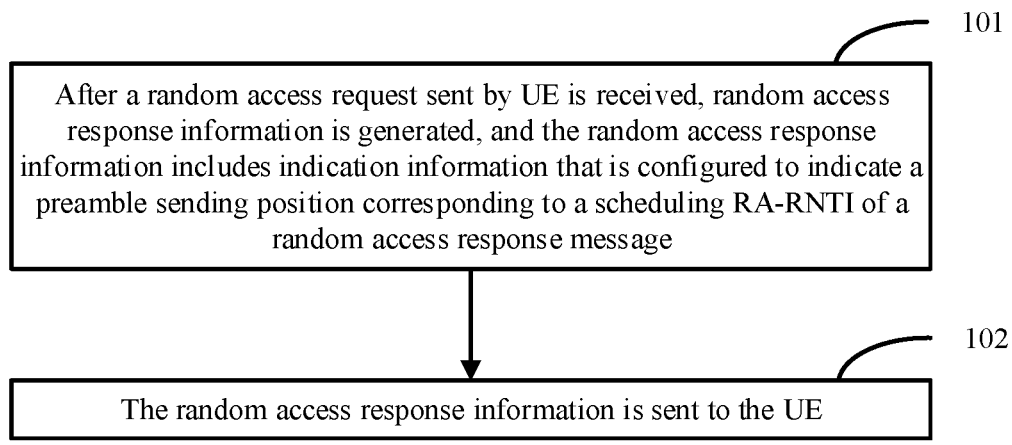
FIG. 1A is a flow chart showing a method for processing random access, according to an exemplary embodiment.

FIG. 1A is a flow chart showing a method for processing random access, according to an exemplary embodiment. The method for processing random access is applied to an access network device such as a base station and the like. As illustrated in FIG. 1A, the method includes the following steps 101 to 102.

In step 101, after a random access request sent by UE is received, random access response information is generated, and the random access response information includes indication information that is configured to indicate a preamble sending position corresponding to a scheduling RA-RNTI of a random access response message.

In step 102, the random access response information is sent to the UE.

In the embodiment, the indication information is added and configured to indicate the preamble sending position corresponding to the scheduling RA-RNTI of the random access response message. A length of the indication information is not limited, and may be fixed or variable. If the length of the indication information is variable, the length of the indication information may be determined according to the total number of corresponding preamble sending positions.

For example, the indication information is configured to indicate a certain preamble sending position before a time when the random access response message is received, and a RA-RNTI corresponding to the preamble sending position is the same as the scheduling RA-RNTI. If the indication information refers to 0, it may indicate a certain preamble sending position which is closest to a time t before the time t when the random access response message is received, and a RA-RNTI corresponding to the preamble sending position is the same as the scheduling RA-RNTI. When the indication information refers to 1, it may indicate a certain preamble sending position which is the second closest to a time t before the time t when the random access response message is received, and a RA-RNTI corresponding to the preamble sending position is the same as the scheduling RA-RNTI. The indication information may also have other valuing manners to determine a time-frequency resource sending position of a preamble corresponding to the RA-RNTI, which are all applicable to the embodiment.

In an embodiment, the random access response information includes scheduling information, and the scheduling information includes the indication information.

Figure 1B:
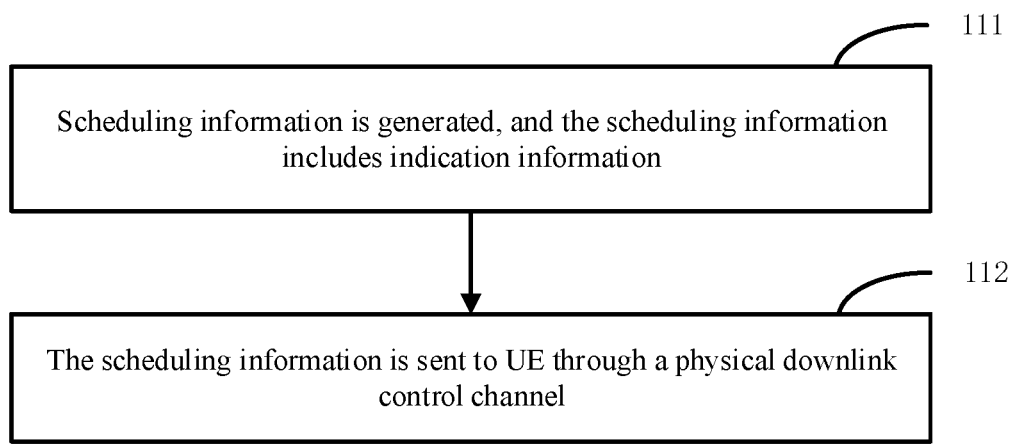
FIG. 1B is a flow chart showing a method for processing random access, according to an exemplary embodiment.

FIG. 1B is a flow chart showing a method for processing random access, according to an exemplary embodiment. The method for processing random access is applied to an access network device such as a base station and the like. As illustrated in FIG. 1B, the method includes the following steps 111 to 112.

In step 111, scheduling information is generated, and the scheduling information includes indication information.

In step 112, the scheduling information is sent to UE through a physical downlink control channel.

In the embodiment, the scheduling information may serve as downlink control information (DCI), and is transmitted in the physical downlink control channel (PDCCH). The scheduling information is sent before sending of the random access response message.

In the embodiment, an information element (IE) is added to the scheduling information to include the indication information.

In an embodiment, the random access response information includes a random access response message, and the random access response message includes the indication information.

Figure 1C:
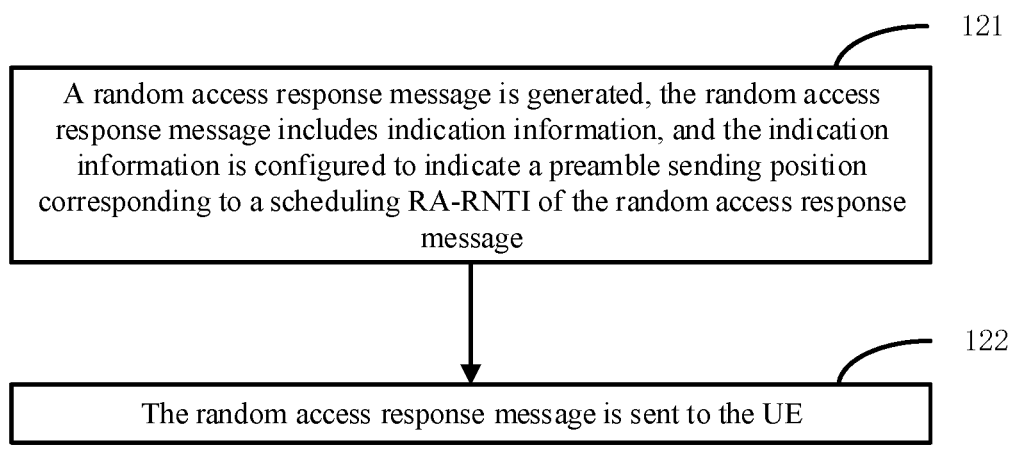
FIG. 1C is a flow chart showing a method for processing random access, according to an exemplary embodiment.

FIG. 1C is a flow chart showing a method for processing random access, according to an exemplary embodiment. The method for processing random access is applied to an access network device such as a base station and the like. As illustrated in FIG. 1C, the method includes the following steps 121 to 122.

In step 121, a random access response message is generated, the random access response message includes indication information, and the indication information is configured to indicate a preamble sending position corresponding to a scheduling RA-RNTI of the random access response message.

In step 122, the random access response message is sent to UE.

According to the embodiment, the random access response message is improved, the indication information is added to the random access response message, thereby facilitating reduction of fuzziness of the preamble sending position.

In an embodiment, step 122 includes step A.

In step A, the random access response information is sent to the UE in a random access response window, and a length of the random access response window is greater than a preset length threshold.

In the embodiment, the preset length threshold may be 10 milliseconds. If the length of the random access response window is greater than the preset length threshold, the scheduling RA-RNTI of the random access response message may correspond to multiple preamble sending positions, so that the random access response message includes the indication information, thereby reducing the fuzziness of the preamble sending position. If the length of the random access response window is not greater than the preset length threshold, the scheduling RA-RNTI of the random access response message may correspond to one preamble sending position, so that the random access response message may include no indication information, thereby saving a message length.

In an embodiment, the random access response message further includes an indicating bit; and the indicating bit is configured to indicate whether the random access response message includes the indication information.

In the embodiment, when a value of the indicating bit is a first value (e.g., 0), it may indicate that the random access response message does not include the indication information. When the value of the indicating bit is a second value (e.g., 1), it may indicate that the random access response message includes the indication information.

After receiving the random access response message, UE first reads the indicating bit; and if the value of the indicating bit is the second value, the UE continues to read the indication information from the random access response message. If the value of the indicating bit is the first value, the UE does not need to read the indication information from the random access response message, which simplifies a process of parsing the random access response message.

Under double guarantee of the indicating bit and the indication information, errors in parsing the indication information may be reduced.

In an embodiment, a body part of the random access response message includes the indication information and the indicating bit.

Figure 2:
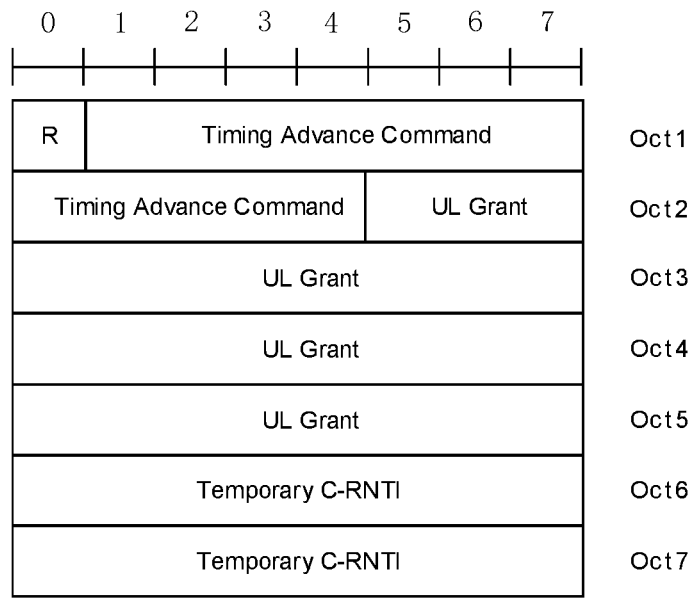
FIG. 2 is schematic diagram showing a random access response message, according to an exemplary embodiment.
Figure 3:
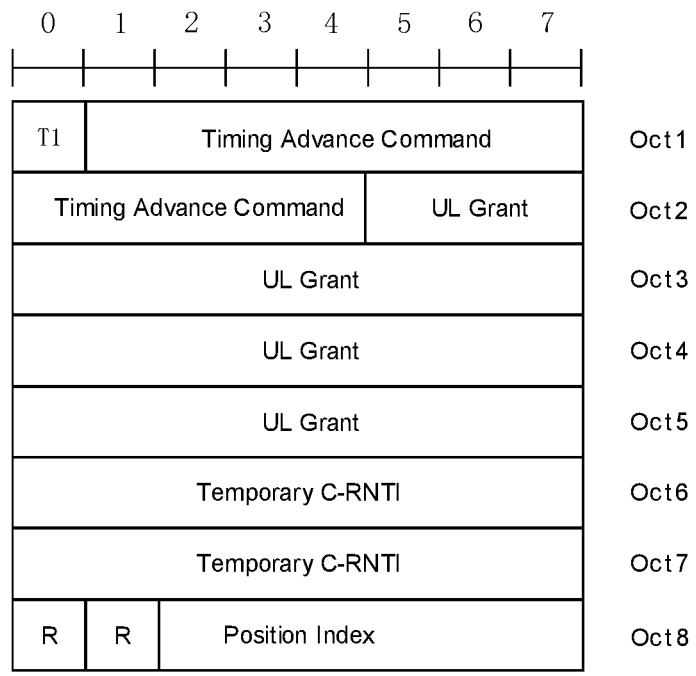
FIG. 3 is schematic diagram showing a random access response message, according to an exemplary embodiment.

In the related art, a body part (RAR payload) of the random access response message is illustrated in FIG. 2. A field R in FIG. 2 is a reserved bit. According to the embodiment, the body part of the random access response message is improved, as illustrated in FIG. 3, the field R is used for an indicating bit T1, an octet (Oct) is added at the end of a random access response message, and at least part of bits of the Oct is used for the indication information. If a length of the indication information is less than 8 bits, it can be padded with the field R. If the length of the indication information is greater than 8 bits, 2 Octs may be added. A length of indication information in FIG. 3 is 6 bits, and the first 2 bits are padded with the field R. FIG. 3 is an example, and position and length of each piece of information in the random access response message are not limited.

According to the embodiment, a body part of the random access response message including the indication information and the indicating bit is realized.

In an embodiment, the body part of the random access response message further includes uplink grant information; and the indicating bit is further configured to indicate whether the random access response message includes the uplink grant information.

Figure 4:
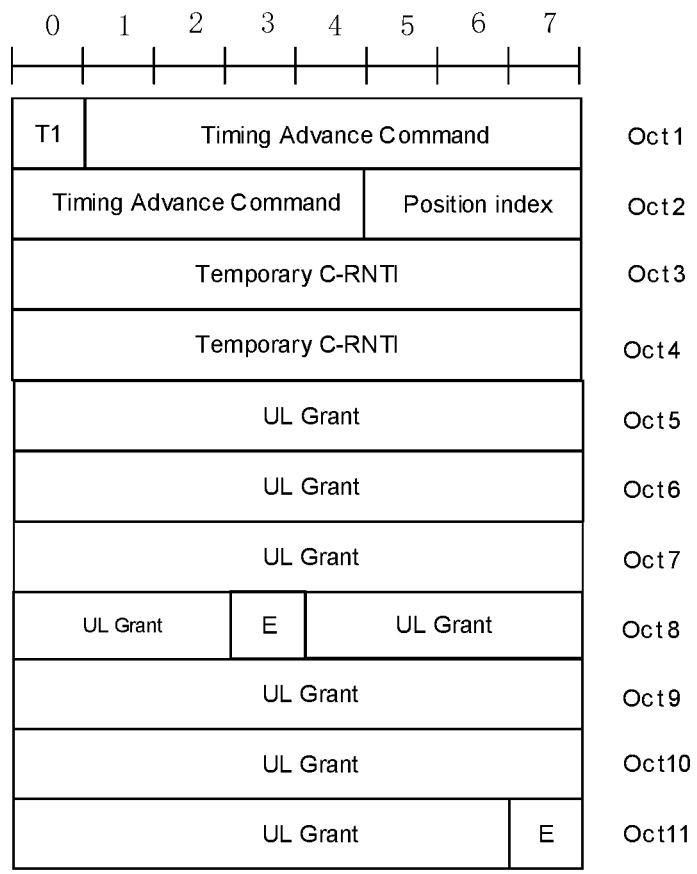
FIG. 4 is schematic diagram showing a random access response message, according to an exemplary embodiment.

In the embodiment, the body part of the random access response message including the uplink grant (UL Grant) information is supported, the uplink grant information may be one or multiple, and the multiple uplink grant information may be partitioned by an extension field E, as illustrated in FIG. 4. In FIG. 3, an information sequence of the body part is: an indicating bit, timing advance command, uplink grant information, cell radio network temporary identifiers (Temporary C-RNTIs), a reserved bit, and indication information (POSITION INDEX); where the length of the indication information is 6 bits. In FIG. 4, an information sequence of the body part is: an indicating bit, timing advance command, indication information, Temporary C-RNTIs, multiple UL Grant information, and an extension field E. The length of the indication information is 3 bits. From the comparison between FIG. 3 and FIG. 4, it can be seen that positions of the various information in the body part can be interchanged, and the length can be variable, depending on actual needs.

In an embodiment, a header part of the random access response message includes the indication information and the indicating bit.

In the embodiment, the header part of the random access response message including the indication information and the indicating bit is supported.

Figure 5:
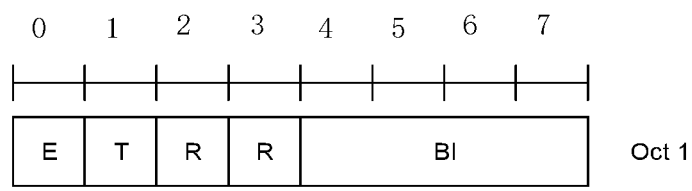
FIG. 5 is schematic diagram showing a random access response message, according to an exemplary embodiment.
Figure 6:
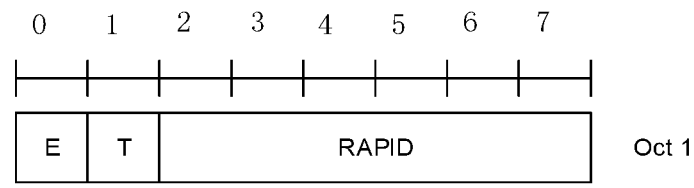
FIG. 6 is schematic diagram showing a random access response message, according to an exemplary embodiment.

In the related art, the header part of the random access response message is illustrated in FIG. 5 or FIG. 6. FIG. 5 shows a header structure containing a backoff indicator (BI). FIG. 6 shows a header structure containing a random access preamble identifier (RAPID). FIG. 5 and FIG. 6 both contain a type field T. When T=0, the header structure illustrated in FIG. 5 is adopted, and when T=1, the header structure illustrated in FIG. 6 is adopted.

Figure 7:
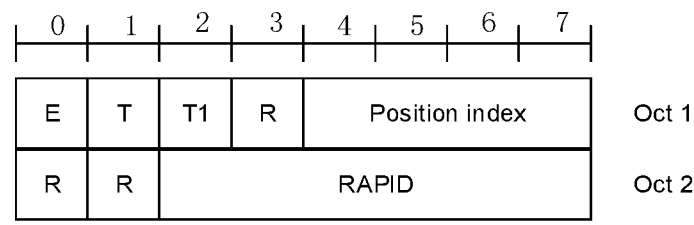
FIG. 7 is schematic diagram showing a random access response message, according to an exemplary embodiment.
Figure 8:
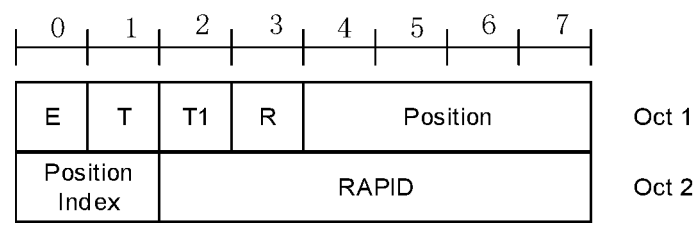
FIG. 8 is schematic diagram showing a random access response message, according to an exemplary embodiment.

In the embodiment, the header structure illustrated in FIG. 5 is improved to include the indication information and the indicating bit. As illustrated in FIG. 7 and FIG. 8, a reserved bit R in Oct 1 of FIG. 5 is changed to an indicating bit T1, the BI is changed to indication information, and Oct 2 is added, so that a RAPID is included at Oct 2. If a length of the RAPID is less than 8 bits, it is padded with the field R. A length of indication information in FIG. 7 is 4 bits, and a length of indication information in FIG. 8 is 6 bits. A type field in FIG. 7 and FIG. 8 is T=0.

An implementation process of the base station side is introduced above, and correspondingly, there are also some improvements made on a UE side. The following describes an implementation process on the UE side.

Figure 9A:
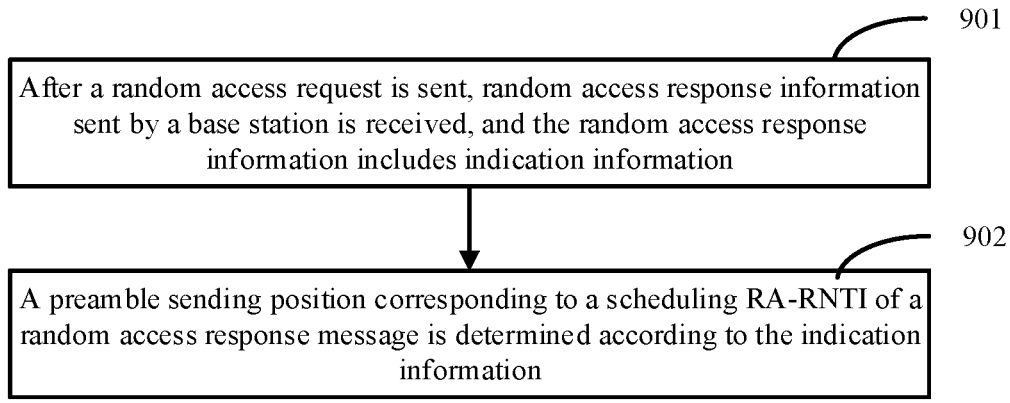
FIG. 9A is a flow chart showing a method for processing random access, according to an exemplary embodiment.

FIG. 9A is a flow chart showing a method for processing random access, according to an exemplary embodiment. The method for processing random access is applied to UE. The UE may be a mobile phone, a computer, a digital broadcast terminal, a messaging device, a gaming console, a tablet, a medical device, exercise equipment, a personal digital assistant, or the like. As illustrated in FIG. 9A, the method includes the following steps 901 to 902.

In step 901, after a random access request is sent, random access response information sent by a base station is received, and the random access response information includes indication information.

In step 902, a preamble sending position corresponding to a scheduling RA-RNTI of a random access response message is determined according to the indication information.

In the embodiment, the UE may receive the indication information. After the indication information is acquired, the preamble sending position corresponds to the scheduling RA-RNTI of the random access response massage may be determined, thereby reducing fuzziness of the preamble sending position.

For example, the indication information is configured to indicate a certain preamble sending position before a time when the random access response message is received, and a RA-RNTI corresponding to the preamble sending position is the same as the scheduling RA-RNTI. If the indication information refers to 0, it may indicate a certain preamble sending position which is closest to a time t before the time t when the random access response message is received, and a RA-RNTI corresponding to the preamble sending position is the same as the scheduling RA-RNTI. When the indication information refers to 1, it may indicate a certain preamble sending position which is the second closest to a time t before the time t when the random access response message is received, and a RA-RNTI corresponding to the preamble sending position is the same as the scheduling RA-RNTI. The indication information may also have other valuing manners to determine a time-frequency resource sending position of a preamble corresponding to the RA-RNTI, which are all applicable to the embodiment.

In an embodiment, the random access response information includes scheduling information, and the scheduling information includes the indication information.

Figure 9B:
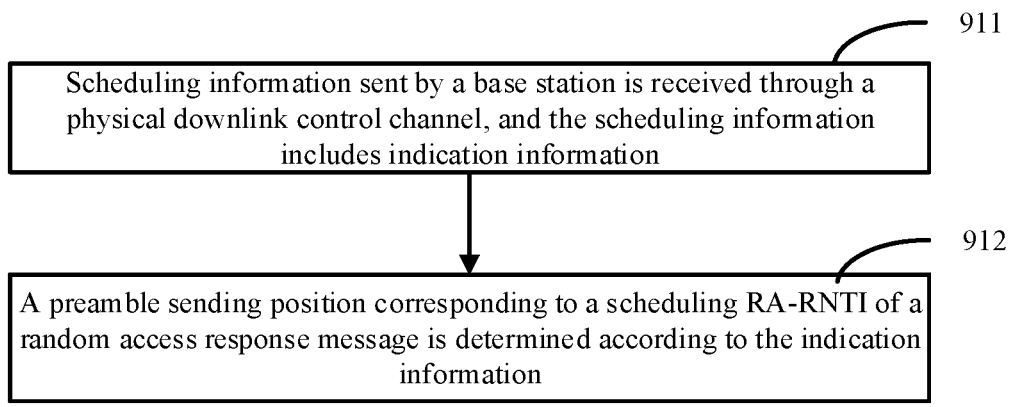
FIG. 9B is a flow chart showing a method for processing random access, according to an exemplary embodiment.

FIG. 9B is a flow chart showing a method for processing random access, according to an exemplary embodiment. The method for processing random access is applied to UE. The UE may be a mobile phone, a computer, a digital broadcast terminal, a messaging device, a gaming console, a tablet, a medical device, exercise equipment, a personal digital assistant, or the like. As illustrated in FIG. 9B, the method includes the following steps 911 to 912.

In step 911, scheduling information sent by a base station is received through a physical downlink control channel, and the scheduling information includes indication information.

In step 912, a preamble sending position corresponding to a scheduling RA-RNTI of a random access response message is determined according to the indication information.

In the embodiment, the scheduling information may serve as DCI, and is transmitted in the PDCCH. The scheduling information is received before receiving the random access response message, so that the UE may receive the indication information in time, thereby better reducing fuzziness of the preamble sending position.

In the embodiment, an IE is added to the DCI to include the scheduling information.

In an embodiment, the random access response information includes a random access response message, and the random access response message includes the indication information.

Figure 9C:
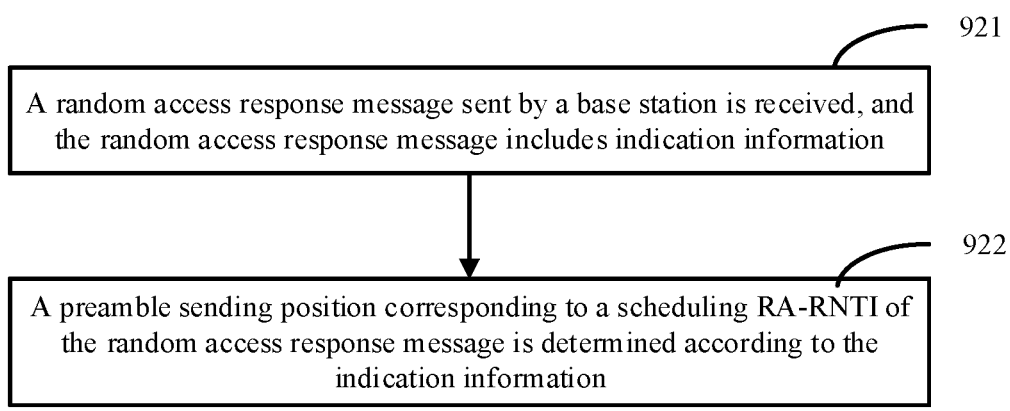
FIG. 9C is a flow chart showing a method for processing random access, according to an exemplary embodiment.

FIG. 9C is a flow chart showing a method for processing random access, according to an exemplary embodiment. The method for processing random access is applied to UE. The UE may be a mobile phone, a computer, a digital broadcast terminal, a messaging device, a gaming console, a tablet, a medical device, exercise equipment, a personal digital assistant, or the like. As illustrated in FIG. 9C, the method includes the following steps 921 to 922.

In step 921, a random access response message sent by a base station is received, and the random access response message includes indication information.

In step 922, a preamble sending position corresponding to a scheduling RA-RNTI of the random access response message is determined according to the indication information.

In the embodiment, the UE may receive the random access response message including the indication information, and may parse the random access response message to acquire the indication information. After the indication information is acquired, the preamble sending position corresponds to the scheduling RA-RNTI of the random access response massage may be determined, thereby reducing fuzziness of the preamble sending position.

In an embodiment, the operation that the random access response information sent by the base station is received includes step B.

In step B, the random access response information sent by the base station is received in a random access response window, and a length of the random access response window is greater than a preset length threshold.

In the embodiment, the preset length threshold may be 10 milliseconds. If the length of the random access response window is greater than the preset length threshold, the scheduling RA-RNTI of the random access response message may correspond to multiple preamble sending positions, so that the random access response message includes the indication information, thereby reducing the fuzziness of the preamble sending position. If the length of the random access response window is not greater than the preset length threshold, the scheduling RA-RNTI of the random access response message may correspond to one preamble sending position, so that the random access response message may include no indication information, thereby saving a message length.

In an embodiment, the random access response message further includes an indicating bit; and the method further includes step C.

In step C, whether the indication information is acquired from the random access response message is determined according to the indicating bit.

In the embodiment, when a value of the indicating bit is a first value (e.g., 0), it may indicate that the random access response message does not include the indication information. When the value of the indicating bit is a second value (e.g., 1), it may indicate that the random access response message includes the indication information.

After receiving the random access response message, UE first reads the indicating bit; and if the value of the indicating bit is the second value, the UE continues to read the indication information from the random access response message. If the value of the indicating bit is the first value, the UE does not need to read the indication information from the random access response message, which simplifies a process of parsing the random access response message.

In an embodiment, a body part of the random access response message includes the indication information and the indicating bit.

As illustrated in FIG. 3, UE may acquire the indication information and the indicating bit by parsing the body part of the random access response message.

In an embodiment, the body part of the random access response message further includes uplink grant information; and the method further includes step D.

In step D, whether the uplink grant information is acquired from the random access response message is determined according to the indicating bit.

As illustrated in FIG. 4, UE may acquire the uplink grant information by parsing the body part of the random access response message. The uplink grant information may be multiple, and different uplink grant information may be distinguished by recognizing an extension field E.

In an embodiment, a header part of the random access response message includes the indication information and the indicating bit.

As illustrated in FIG. 6 and FIG. 7, UE may acquire the indication information and the indicating bit by parsing the header part of the random access response message.

The implementation process will be introduced below in combination with the base station side and the UE side.

Figure 10:
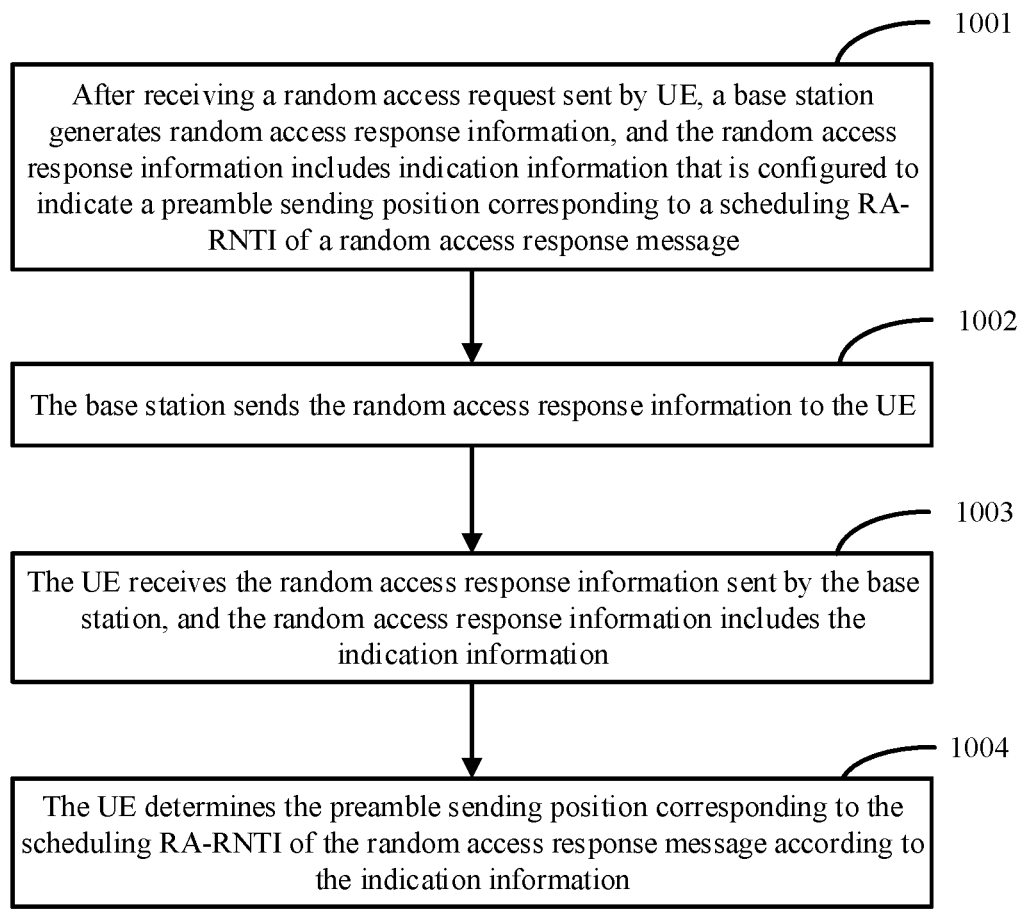
FIG. 10 is a flow chart showing a method for processing random access, according to an exemplary embodiment.

FIG. 10 is a flow chart showing a method for processing random access, according to an exemplary embodiment. As illustrated in FIG. 10, the method includes the following steps 1001 to 1004.

In step 1001, after receiving a random access request sent by UE, a base station generates random access response information, and the random access response information includes indication information that is configured to indicate a preamble sending position corresponding to a scheduling RA-RNTI of a random access response message.

In step 1002, the base station sends the random access response information to the UE.

In step 1003, the UE receives the random access response information sent by the base station, and the random access response information includes the indication information.

In step 1004, the UE determines the preamble sending position corresponding to the scheduling RA-RNTI of the random access response message according to the indication information.

The above various embodiments may be freely combined according to actual requirements.

The below are apparatus embodiments of the present disclosure, which may be configured to execute the method embodiments of the present disclosure.

Figure 11A:
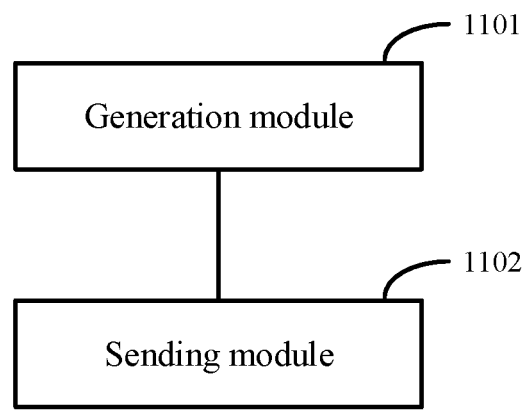
FIG. 11A is a block diagram of an apparatus for processing random access, according to an exemplary embodiment.

FIG. 11A is a block diagram of an apparatus for processing random access, according to an exemplary embodiment. The apparatus may be implemented into part or all of an electronic device through software, hardware or a combination of the two. The apparatus for processing random access is applied to a base station side, and referring to FIG. 11A, includes a generation module 1101 and a sending module 1102.

The generation module 1101 is configured to, after receiving a random access request sent by UE, generate random access response information, and the random access response information includes indication information that is configured to indicate a preamble sending position corresponding to a scheduling RA-RNTI of a random access response message.

The sending module 1102 is configured to send the random access response information to the UE.

In an embodiment, the random access response information includes scheduling information, and the scheduling information includes the indication information.

In an embodiment, the random access response information includes a random access response message, and the random access response message includes the indication information.

Figure 11B:
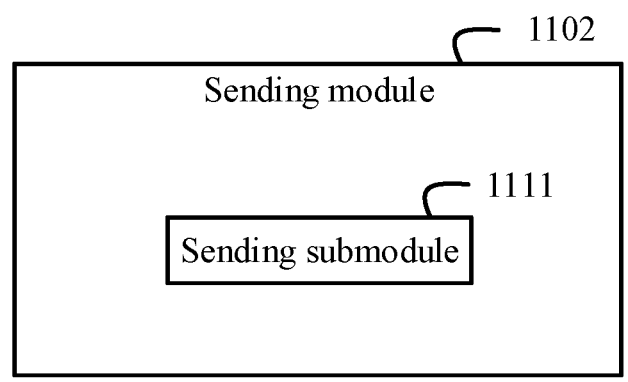
FIG. 11B is a block diagram of a sending module, according to an exemplary embodiment.

In an embodiment, as illustrated in FIG. 11B, the sending module 1102 includes a sending submodule 1111.

The sending submodule 1111 is configured to send the random access response information to the UE in a random access response window, and a length of the random access response window is greater than a preset length threshold.

In an embodiment, the random access response message further includes an indicating bit; and the indicating bit is configured to indicate whether the random access response message includes the indication information.

In an embodiment, a body part of the random access response message includes the indication information and the indicating bit.

In an embodiment, the body part of the random access response message further includes uplink grant information; and the indicating bit is further configured to indicate whether the random access response message includes the uplink grant information.

In an embodiment, a header part of the random access response message includes the indication information and the indicating bit.

Figure 12A:
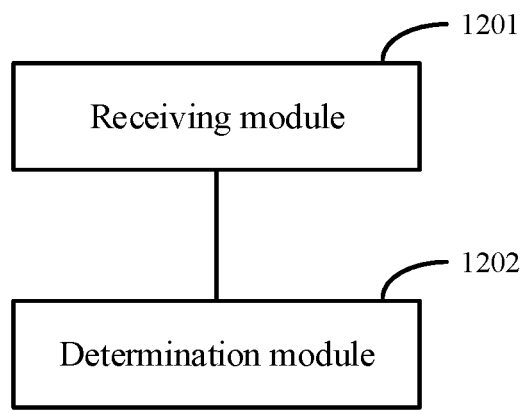
FIG. 12A is a block diagram of an apparatus for processing random access, according to an exemplary embodiment.

FIG. 12A is a block diagram of an apparatus for processing random access, according to an exemplary embodiment. The apparatus may be implemented into part or all of an electronic device through software, hardware or a combination of the two. The apparatus for processing random access is applied to a UE side, and referring to FIG. 12A, includes a receiving module 1201 and a determination module 1202.

The receiving module 1201 is configured to, after sending a random access request, receive random access response information sent by a base station, and the random access response information includes indication information.

The determination module 1202 is configured to determine a preamble sending position corresponding to a scheduling RA-RNTI of a random access response message according to the indication information.

In an embodiment, the random access response information includes scheduling information, and the scheduling information includes the indication information.

In an embodiment, the random access response information includes a random access response message, and the random access response message includes the indication information.

Figure 12B:
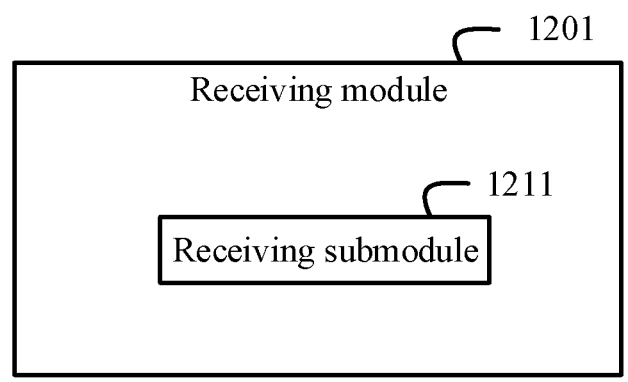
FIG. 12B is a block diagram of a receiving module, according to an exemplary embodiment.

In an embodiment, as illustrated in FIG. 12B, the receiving module 1201 includes a receiving submodule 1211.

The receiving submodule 1211 is configured to receive the random access response information sent by the base station in a random access response window, and a length of the random access response window is greater than a preset length threshold.

Figure 13:
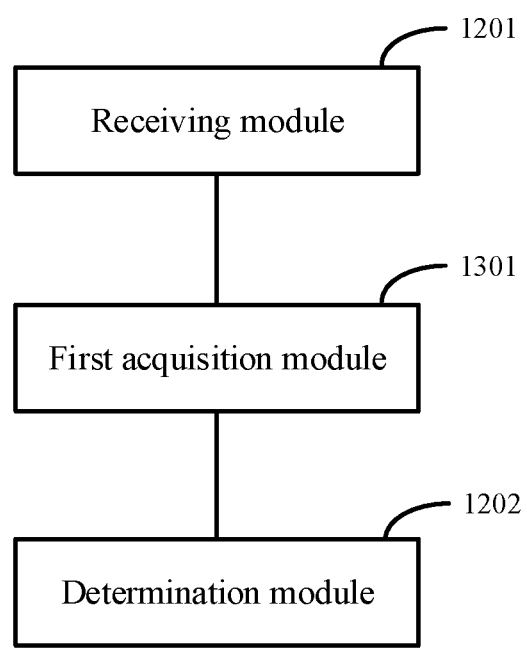
FIG. 13 is a block diagram of an apparatus for processing random access, according to an exemplary embodiment.

In an embodiment, the random access response message further includes an indicating bit; as illustrated in FIG. 13, the apparatus further includes a first acquisition module 1301.

The first acquisition module 1301 is configured to determine, according to the indicating bit, whether the indication information is acquired from the random access response message.

In an embodiment, a body part of the random access response message includes the indication information and the indicating bit.

Figure 14:
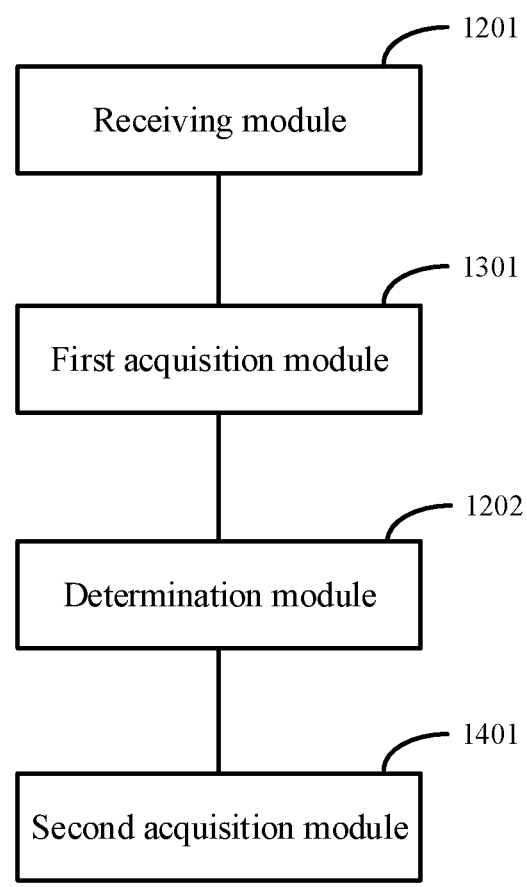
FIG. 14 is a block diagram of an apparatus for processing random access, according to an exemplary embodiment.

In an embodiment, the body part of the random access response message further includes uplink grant information; and as illustrated in FIG. 14, the apparatus further includes a second acquisition module 1401.

The second acquisition module 1401 is configured to determine, according to the indicating bit, whether the uplink grant information is acquired from the random access response message.

In an embodiment, a header part of the random access response message includes the indication information and the indicating bit.

With respect to the apparatus in any above embodiments, the specific manner for the operation executed by each module has been described in detail in the embodiments related to the method, and is not elaborated herein.

Figure 15:
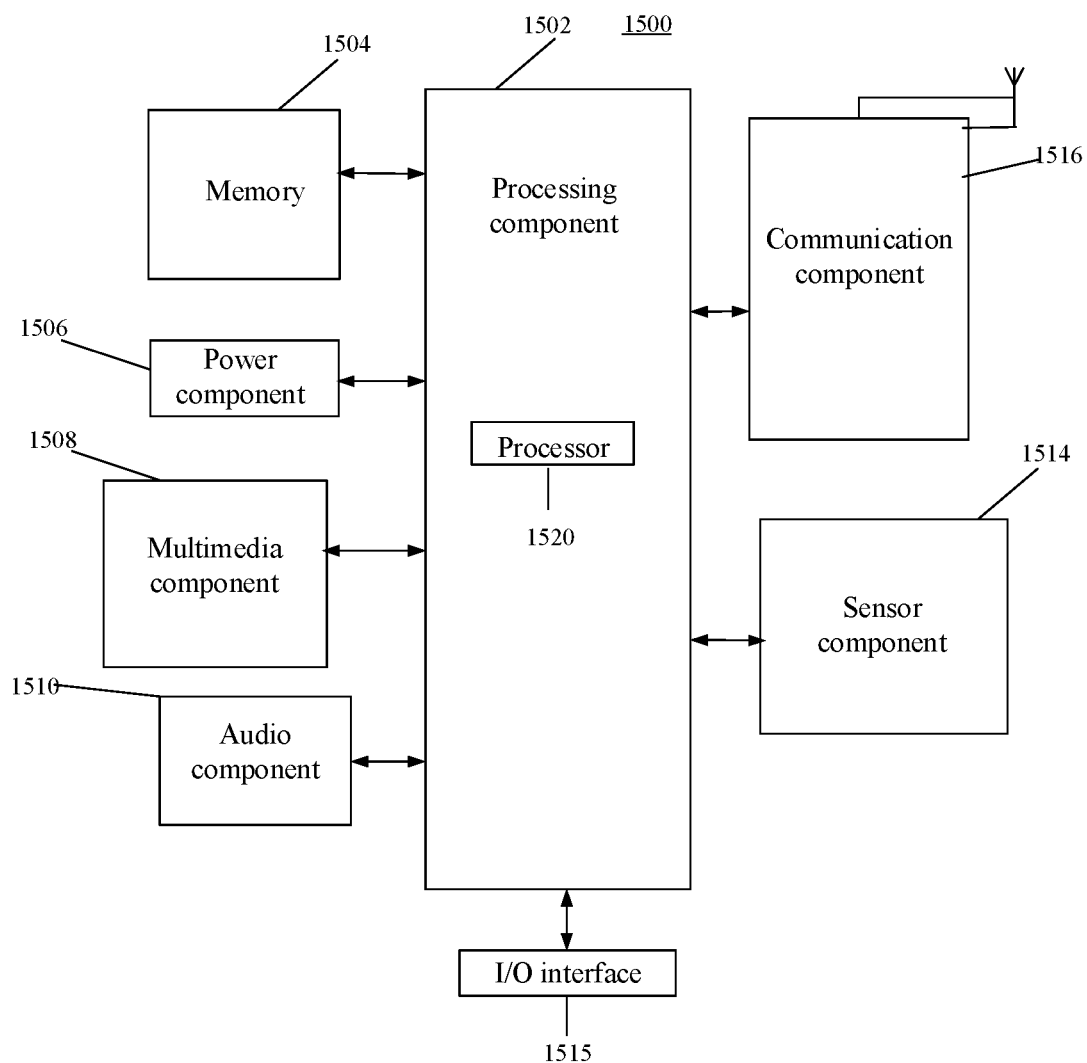
FIG. 15 is a block diagram of an apparatus applicable to processing of random access, according to an exemplary embodiment.

FIG. 15 is a block diagram of an apparatus applicable to processing of random access, according to an exemplary embodiment. For example, the apparatus 1500 may be a mobile phone, a computer, a digital broadcast terminal, a messaging device, a gaming console, a tablet, a medical device, exercise equipment, a personal digital assistant and the like.

The apparatus 1500 may include one or more of the following components: a processing component 1502, a memory 1504, a power component 1506, a multimedia component 1508, an audio component 1510, an input/output (I/O) interface 1515, a sensor component 1514, or a communication component 1516.

The processing component 1502 typically controls overall operations of the apparatus 1500, such as the operations associated with display, telephone calls, data communications, camera operations, and recording operations. The processing component 1502 may include one or more processors 1520 to execute instructions to perform all or part of the steps in the abovementioned method. Moreover, the processing component 1502 may include one or more modules which facilitate interaction between the processing component 1502 and other components. For instance, the processing component 1502 may include a multimedia module to facilitate interaction between the multimedia component 1508 and the processing component 1502.

The memory 1504 is configured to store various types of data to support the operation of the apparatus 1500. Examples of such data include instructions for any applications or methods operated on the apparatus 1500, contact data, phonebook data, messages, pictures, video, etc. The memory 1504 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 1506 provides power for various components of the apparatus 1500. The power component 1506 may include a power management system, one or more power supplies, and other components associated with generation, management and distribution of power for the apparatus 1500.

The multimedia component 1508 includes a screen providing an output interface between the apparatus 1500 and a user. In some embodiments, the screen may include a liquid crystal display (LCD) and a touch panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a period of time and a pressure associated with the touch or swipe action. In some embodiments, the multimedia component 1508 includes a front camera and/or a rear camera. The front camera and/or the rear camera may receive external multimedia data when the apparatus 1500 is in an operation mode, such as a photographing mode or a video mode. Each of the front camera and the rear camera may be a fixed optical lens system or have focusing and optical zooming capabilities.

The audio component 1510 is configured to output and/or input an audio signal. For example, the audio component 1510 includes a microphone (MIC), and the MIC is configured to receive an external audio signal when the apparatus 1500 is in an operation mode, such as a call mode, a recording mode and a voice recognition mode. The received audio signal may further be stored in the memory 1504 or sent through the communication component 1516. In some embodiments, the audio component 1510 further includes a speaker configured to output the audio signal.

The I/O interface 1515 provides an interface between the processing component 1502 and peripheral interface modules, such as a keyboard, a click wheel, buttons and the like. The buttons may include, but are not limited to: a home button, a volume button, a starting button and a locking button.

The sensor component 1514 includes one or more sensors configured to provide status assessments in various aspects for the apparatus 1500. For instance, the sensor component 1514 may detect an on/off status of the apparatus 1500 and relative positioning of components, such as a display and small keyboard of the apparatus 1500, and the sensor component 1514 may further detect a change in a position of the apparatus 1500 or a component of the apparatus 1500, presence or absence of contact between the user and the apparatus 1500, orientation or acceleration/deceleration of the apparatus 1500 and a change in temperature of the apparatus 1500. The sensor component 1514 may include a proximity sensor configured to detect presence of an object nearby without any physical contact. The sensor component 1514 may also include a light sensor, such as a complementary metal oxide semiconductor (CMOS) or charge coupled device (CCD) image sensor, configured for use in an imaging application. In some embodiments, the sensor component 1514 may also include an acceleration sensor, a gyroscope sensor, a magnetic sensor, a pressure sensor or a temperature sensor.

The communication component 1516 is configured to facilitate wired or wireless communication between the apparatus 1500 and other devices. The apparatus 1500 may access a communication-standard-based wireless network, such as a wireless fidelity (WiFi) network, a 2nd-generation (2G) or 3rd-generation (3G) network or a combination thereof. In an exemplary embodiment, the communication component 1516 receives a broadcast signal or broadcast associated information from an external broadcast management system through a broadcast channel. In an exemplary embodiment, the communication component 1516 further includes a near field communication (NFC) module to facilitate short-range communications. For example, the NFC module may be implemented based on a radio frequency identification (RFID) technology, an infrared data association (IrDA) technology, an ultra wide band (UWB) technology, a Bluetooth (BT) technology, and other technologies.

In an exemplary embodiment, the apparatus 1500 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, and is configured to execute the abovementioned method.

In an exemplary embodiment, there is also provided a non-transitory computer-readable storage medium including instructions, such as included in the memory 1504, executable by the processor 1520 of the apparatus 1500 for performing the abovementioned methods. For example, the non-transitory computer-readable storage medium may be a ROM, a random access memory (RAM), a compact disc read-only memory (CD-ROM), a magnetic tape, a floppy disc, an optical data storage device, and the like.

In an exemplary embodiment, an apparatus for processing random access is provided, which includes: a processor; and a memory configured to store instructions executable by the processor.

The processor is configured to:
receive, after sending a random access request, random access response information sent by a base station, the random access response information including indication information; and
determine a preamble sending position corresponding to a scheduling RA-RNTI of the random access response message according to the indication information.

The processor may further be configured as follows:
the operation that the random access response information sent by the base station is received includes: the random access response information sent by the base station is received in a random access response window; and a length of the random access response window is greater than a preset length threshold.

The processor may further be configured as follows:
the random access response information includes scheduling information, and the scheduling information includes the indication information.

The processor may further be configured as follows:
the random access response information includes a random access response message, and the random access response message includes the indication information.

The processor may further be configured as follows:
the random access response message further includes an indicating bit; and
the method further includes: whether the indication information is acquired from the random access response message is determined according to the indicating bit.

The processor may further be configured as follows:
a body part of the random access response message includes the indication information and the indicating bit.

The processor may further be configured as follows:
the body part of the random access response message further includes uplink grant information; and
the method further includes: whether the uplink grant information is acquired from the random access response message is determined according to the indicating bit.

The processor may further be configured as follows:
a header part of the random access response message includes the indication information and the indicating bit.

According to a computer-readable storage medium, instructions in the storage medium are executed by a processor of a device to cause the device to execute the method for processing random access, and the method includes:
receiving, after sending a random access request, random access response information sent by a base station, the random access response information including indication information; and
determining a preamble sending position corresponding to a scheduling RA-RNTI of a random access response message according to the indication information.

The instructions in the storage medium may further include:
the operation that the random access response information sent by the base station is received includes: the random access response information sent by the base station is received in a random access response window, and a length of the random access response window is greater than a preset length threshold.

The instructions in the storage medium may further include:
the random access response information includes scheduling information, and the scheduling information includes the indication information.

The instructions in the storage medium may further include:
the random access response information includes a random access response message, and the random access response message includes the indication information.

The instructions in the storage medium may further include:
the random access response message further includes an indicating bit; and
the method further includes: whether the indication information is acquired from the random access response message is determined according to the indicating bit.

The instructions in the storage medium may further include:
a body part of the random access response message includes the indication information and the indicating bit.

The instructions in the storage medium may further include:
the body part of the random access response message further includes uplink grant information; and
the method further includes: whether the uplink grant information is acquired from the random access response message is determined according to the indicating bit.

The instructions in the storage medium may further include:
a header part of the random access response message includes the indication information and the indicating bit.

Figure 16:
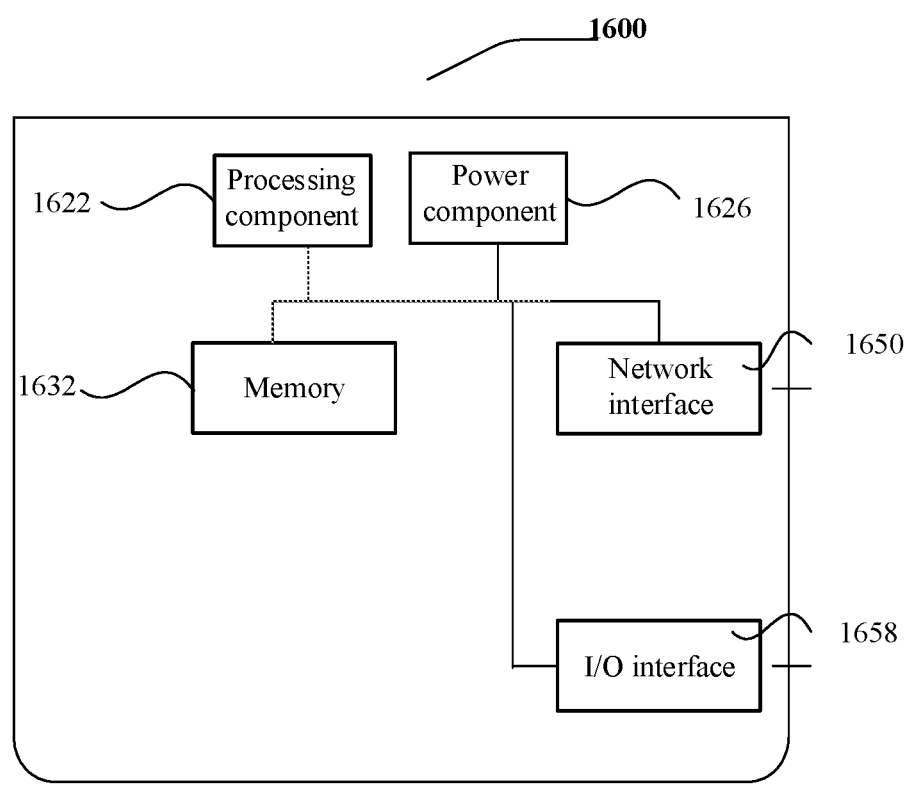
FIG. 16 is a block diagram of an apparatus applicable to processing of random access, according to an exemplary embodiment.

FIG. 16 is a block diagram of an apparatus 1600 applicable to processing of random access, according to an exemplary embodiment. For example, the apparatus 1600 may be provided as a computer. Referring to FIG. 16, the apparatus 1600 includes a processing component 1622, further including one or more processors, and a memory resource represented by a memory 1632, configured to store instructions executable by the processing component 1622, for example, an application program. The application program stored in the memory 1632 may include one or more than one module of which each corresponds to a set of instructions. In addition, the processing component 1622 is configured to execute the instructions to execute the method for processing random access.

The apparatus 1600 may further include a power component 1626 configured to execute power management of the apparatus 1600, a wired or wireless network interface 1650 configured to connect the apparatus 1600 to a network, and an I/O interface 1658. The apparatus 1600 may be operated based on an operating system stored in the memory 1632, for example, Windows Server™, Mac OS X™, Unix™, Linux™, FreeBSD™ or the like.

In an exemplary embodiment, an apparatus for processing random access is provided, which includes: a processor; and a memory configured to store instructions executable by the processor.

The processor is configured to:
generate, after receiving a random access request sent by UE, random access response information, the random access response information including indication information that is configured to indicate a preamble sending position corresponding to a scheduling RA-RNTI of a random access response message; and
send the random access response information to the UE.

The processor may further be configured as follows:
the operation that the random access response information is sent to the UE includes: the random access response information is sent to the UE in a random access response window, and a length of the random access response window is greater than a preset length threshold.

The processor may further be configured as follows:
the random access response information includes scheduling information, and the scheduling information includes the indication information.

The processor may further be configured as follows:
the random access response information includes a random access response message, and the random access response message includes the indication information.

The processor may further be configured as follows:
the random access response message further includes an indicating bit; and the indicating bit is configured to indicate whether the random access response message includes the indication information.

The processor may further be configured as follows:
a body part of the random access response message includes the indication information and the indicating bit.

The processor may further be configured as follows:
the body part of the random access response message further includes uplink grant information; and the indicating bit is further configured to indicate whether the random access response message includes the uplink grant information.

The processor may further be configured as follows:
a header part of the random access response message includes the indication information and the indicating bit.

According to a computer-readable storage medium, instructions in the storage medium are executed by a processor of a device to cause the device to execute the method for processing random access, and the method includes:
generating, after receiving a random access request sent by UE, random access response information, the random access response information including indication information that is configured to indicate a preamble sending position corresponding to a scheduling RA-RNTI of a random access response message; and
sending the random access response information to the UE.

The instructions in the storage medium may further include:
the operation that the random access response information is sent to the UE includes: the random access response information is sent to the UE in a random access response window; and a length of the random access response window is greater than a preset length threshold.

The instructions in the storage medium may further include:
the random access response information includes scheduling information, and the scheduling information includes the indication information.

The instructions in the storage medium may further include:
the random access response information includes a random access response message, and the random access response message includes the indication information.

The instructions in the storage medium may further include:
the random access response message further includes an indicating bit; and the indicating bit is configured to indicate whether the random access response message includes the indication information.

The instructions in the storage medium may further include:
a body part of the random access response message includes the indication information and the indicating bit.

The instructions in the storage medium may further include:
the body part of the random access response message further includes uplink grant information; and the indicating bit is further configured to indicate whether the random access response message includes the uplink grant information.

The instructions in the storage medium may further include:
a header part of the random access response message includes the indication information and the indicating bit.

The technical solution provided in the embodiments of the present disclosure may have following beneficial effects including: the indication information added is configured to indicate the preamble sending position corresponding to the scheduling RA-RNTI of the random access response message; thus, the UE may determine which preamble sending position corresponds to the scheduling RA-RNTI of the random access response massage, thereby reducing fuzziness of the preamble sending position.

Furthermore, the technical solution provided in the embodiments of the present disclosure may have following beneficial effects including: when the length of the random access response window is greater than the preset length threshold, that is, when the scheduling RA-RNTI of the random access response message may correspond to multiple preamble sending positions, the random access response message includes indication information, for reducing collision; the indication information is added to the scheduling information, which provides a feasible solution; the indication information is added to the random access response message, which provides a feasible solution; whether the random access response message includes the indication information is informed to the UE through the indicating bit, so that the UE may better acquire the indication information; the body part may include the indication information and the indicating bit, which provides a feasible solution; the random access response message may further support transmission of the uplink grant information, thereby achieving good compatibility; the header part may include the indication information and the indicating bit, which provides a feasible solution.

Moreover, in the present invention, indication information is added which is used to indicate the preamble sending position corresponding to the scheduling RA-RNTI of the random access response message. In the foregoing manner, the UE may determine which preamble sending position corresponds to the scheduling RA-RNTI of the random access response message according to the indication information so as to reduce the ambiguity of the preamble sending position.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for processing random access, comprising:
   receiving, by a base station, a random access request sent by a user equipment (UE), wherein the random access request comprises a preamble;
   generating, by the base station, a random access response message, wherein in response to a length of a random access response window being greater than a preset length threshold, the random access response message comprises indication information, and in response to the length of the random access response window being not greater than the preset length threshold, the random access response message does not comprise the indication information, wherein the indication information is configured to indicate a sending position where the preamble corresponding to a scheduling random access radio network temporary identifier (RA-RNTI) of the random access response message is sent, wherein the scheduling RA-RNTI of the random access response message corresponds to multiple sending positions in response to the length of the random access response window being greater than the preset length threshold; and
   sending, by the base station, the random access response message to the UE.

2. The method of claim 1, wherein sending the random access response message to the UE comprises:
   sending the random access response message to the UE in the random access response window; wherein the length of the random access response window is greater than the preset length threshold.

3. The method of claim 1, wherein the random access response message comprises scheduling information, and the scheduling information comprises the indication information.

4. The method of claim 1, wherein the random access response message further comprises: an indicating bit; and the indicating bit is configured to indicate whether the random access response message comprises the indication information.

5. The method of claim 4, wherein a body part of the random access response message comprises the indication information and the indicating bit.

6. The method of claim 5, wherein the body part of the random access response message further comprises: uplink grant information; and the indicating bit is further configured to indicate whether the random access response message comprises the uplink grant information.

7. The method of claim 4, wherein a header part of the random access response message comprises the indication information and the indicating bit.

8. A method for processing random access, comprising:
   sending, by a user equipment (UE), a random access request to a base station, wherein the random access request comprises a preamble;
   receiving, by the UE, a random access response message sent by the base station; wherein in response to a length of a random access response window being greater than a preset length threshold, the random access response message comprises indication information, and in response to the length of the random access response window being not greater than the preset length threshold, the random access response message does not comprise the indication information; and
   determining, by the UE, a sending position where the preamble corresponding to a scheduling random access radio network temporary identifier (RA-RNTI) of the random access response message is sent according to the indication information, wherein the scheduling RA-RNTI of the random access response message corresponds to multiple sending positions in response to the length of the random access response window being greater than the preset length threshold.

9. The method of claim 8, wherein receiving the random access response message sent by the base station comprises:
   receiving the random access response message sent by the base station in the random access response window; wherein the length of the random access response window is greater than the preset length threshold.

10. The method of claim 8, wherein the random access response message comprises scheduling information, and the scheduling information comprises the indication information.

11. The method of claim 8, wherein the random access response message further comprises: an indicating bit; and the method further comprises:
    determining, according to the indicating bit, whether the indication information is acquired from the random access response message.

12. The method of claim 11, wherein a body part of the random access response message comprises the indication information and the indicating bit.

13. The method of claim 12, wherein the body part of the random access response message further comprises: uplink grant information; and the method further comprises:
    determining, according to the indicating bit, whether the uplink grant information is acquired from the random access response message.

14. The method of claim 11, wherein a header part of the random access response message comprises the indication information and the indicating bit.

15. An apparatus for processing random access, comprising:
a processor; and
a memory configured to store instructions executable by the processor;
wherein the processor is configured to:
send a random access request to a base station, wherein the random access request comprises a preamble;
receive a random access response message sent by the base station; wherein in response to a length of a random access response window being greater than a preset length threshold, the random access response message comprises indication information, and in response to the length of the random access response window being not greater than the preset length threshold, the random access response message does not comprise the indication information; and
determine a sending position where the preamble corresponding to a scheduling random access radio network temporary identifier (RA-RNTI) of the random access response message is sent according to the indication information, wherein the scheduling RA-RNTI of the random access response message corresponds to multiple sending positions in response to the length of the random access response window being greater than the preset length threshold.

16. The apparatus of claim 15, wherein the processor is further configured to:
receive the random access response message sent by the base station in a random access response window; wherein a length of the random access response window is greater than a preset length threshold.

17. The apparatus of claim 15, wherein the random access response message comprises scheduling information, and the scheduling information comprises the indication information.

18. The apparatus of claim 15, wherein the random access response message further comprises: an indicating bit and the processor is further configured to:
determine, according to the indicating bit, whether the indication information is acquired from the random access response message.

* * * * *